United States Patent [19]

Tomassini

[11] 4,256,970
[45] Mar. 17, 1981

[54] APPARATUS FOR THE EXPLOITATION OF UNDERWATER CURRENTS FOR THE PRODUCTION OF ELECTRICAL ENERGY

[75] Inventor: Osvaldo Tomassini, Taranto, Italy

[73] Assignee: Eugene Pascucci, Trenton, N.J.; a part interest

[21] Appl. No.: 51,708

[22] Filed: Jun. 25, 1979

[51] Int. Cl.³ .............................................. F03B 13/10
[52] U.S. Cl. ........................................ 290/53; 416/65
[58] Field of Search ...................... 290/42, 53; 416/84, 416/85, 65; 417/100

[56] References Cited

U.S. PATENT DOCUMENTS

| | | | |
|---|---|---|---|
| 1,441,361 | 1/1923 | Lindsey | 416/65 |
| 3,928,771 | 12/1975 | Straumsnes | 290/42 |

Primary Examiner—Gene Z. Rubinson
Assistant Examiner—D. L. Rebsch
Attorney, Agent, or Firm—Richard C. Woodbridge

[57] ABSTRACT

A rotor having slidable blades is employed to efficiently produce electrical energy from underwater currents. The device includes a structure having four columns which rises from the seabed and supports a circular monorail system. A circular housing fits on top of the monorail. An interior and exterior gear rack on the monorail engage with motors within the circular housing. Four vertical rack structures are associated with the circular housing and may be driven up and down by another set of motors within the circular housing. Electrical generators are contained within a control house supported by the vertical rack structures. The rotor preferably comprises a housing having four slots which slidably receive four blades which reciprocate up and down as the rotor turns. An automatic control device can position the rotor vertically and horizontally so it impinges on the underwater current having the optimum velocity.

13 Claims, 12 Drawing Figures

APPARATUS FOR THE EXPLOITATION OF UNDERWATER CURRENTS FOR THE PRODUCTION OF ELECTRICAL ENERGY

BACKGROUND OF THE INVENTION

1. Field of the Invention

This invention includes a rotary means having slidable, reciprocating blades for efficiently extracting electrical energy from underwater currents.

2. Description of the Prior Art

There are a variety of different devices which produce electrical energy from water currents. For example, turbines are frequently used in combination with dam structures to extract hydroelectric power from rivers and streams. Similarly, there have been attempts over the years to take energy from areas of high tides, such as the Bay of Fundy. Moreover, there are presently devices which can extract minimal amounts of energy from wave motion alone. However, there are not now believed to exist efficient structures which can tap the strong underwater currents known to exist under the sea and in fast flowing rivers and streams. Because of the mass and velocity of underwater currents that exist in places such as the Straits of Messina, it is likely that large amounts of energy could be taken from those sources.

SUMMARY OF THE INVENTION

Briefly, described, the invention comprises a device for efficiently extracting electrical energy from underwater currents. A structure having four columns or pilons is anchored in the seabed and rises above the level of the water. A circular monorail is mounted on top of the columns. The monorail includes an interior and exterior gear rack and is capped by a circular rotatable housing. The housing includes eight motor and gear combinations which engage the interior and exterior gear racks and drive the circular ring in a plane horizontal to the surface of the water. Four vertical rack structures are attached to the circular ring. Each vertical structure includes four vertical gear racks which engage with thirty-two motor and gear combinations within the circular housing. A control house sits on top of the vertical housing. Conventional generators are kept within the control house. The control house may have several floors in which to house an operational headquarters, recreation area, an automatic computer mechanism, etc. A helicopter landing pad may be located above the top floor.

The rotor is attached to the legs of the vertical rack housing and is generally totally submerged even though there are circumstances under which the top of the rotor may extend above the plane of the water. The rotor includes a housing having four slot fed passageways which intersect at the center of the rotor housing. Each of the slots contains a reciprocating blade which is free to slide back and forth. Each blade includes a tab which prevents the blade from falling out of the rotor housing.

The rotor is preferably located vertically and horizontally in the path of a strong underwater current. The weight of the blade naturally causes it to assume a position of lowest potential. That is, the blade will always tend to slide downwardly into the lower 180° portion of the rotor housing. Accordingly, as the rotor revolves, each blade, as it moves into the upper 180° of the rotor housing, will slide through the center of the rotor housing and assume a second position in the lower 180° portion of the rotor housing. This procedure continues indefinitely as the rotor turns. The rotor blades may be filled with a heavy liquid, such as mercury, in order to increase the force of gravity on the blades and cause them to slide more quickly. The rotor turns because the resistance on the top of the rotor, due to the absence of blades, is less than the resistance on the bottom 180° of the rotor. The rotor may be mechanically connected to the generators by means of a gear train or through a pair of right angle drives and a vertical shaft combination.

According to an alternative embodiment of the present invention the rotor housing may be solid and the blades may comprise a plurality of curved flaps pivotally connected at their edges to the periphery of the rotor housing. An automatic computer in the control house can drive the vertical and horizontal motors in such a fashion as to optimally position the rotor perpendicular to the strongest flow of the underwater current. Calculations indicate that the power generated is proportional to the area of the rotor and the cube of the velocity of the current. These and other features of the present invention will be more fully understood with reference to the following drawings and detailed description.

DETAILED DESCRIPTION OF THE PREFERRED EMBODIMENT

During the course of this description, like numbers will be used to indicate like elements according to the different views of the invention.

Figure 12:
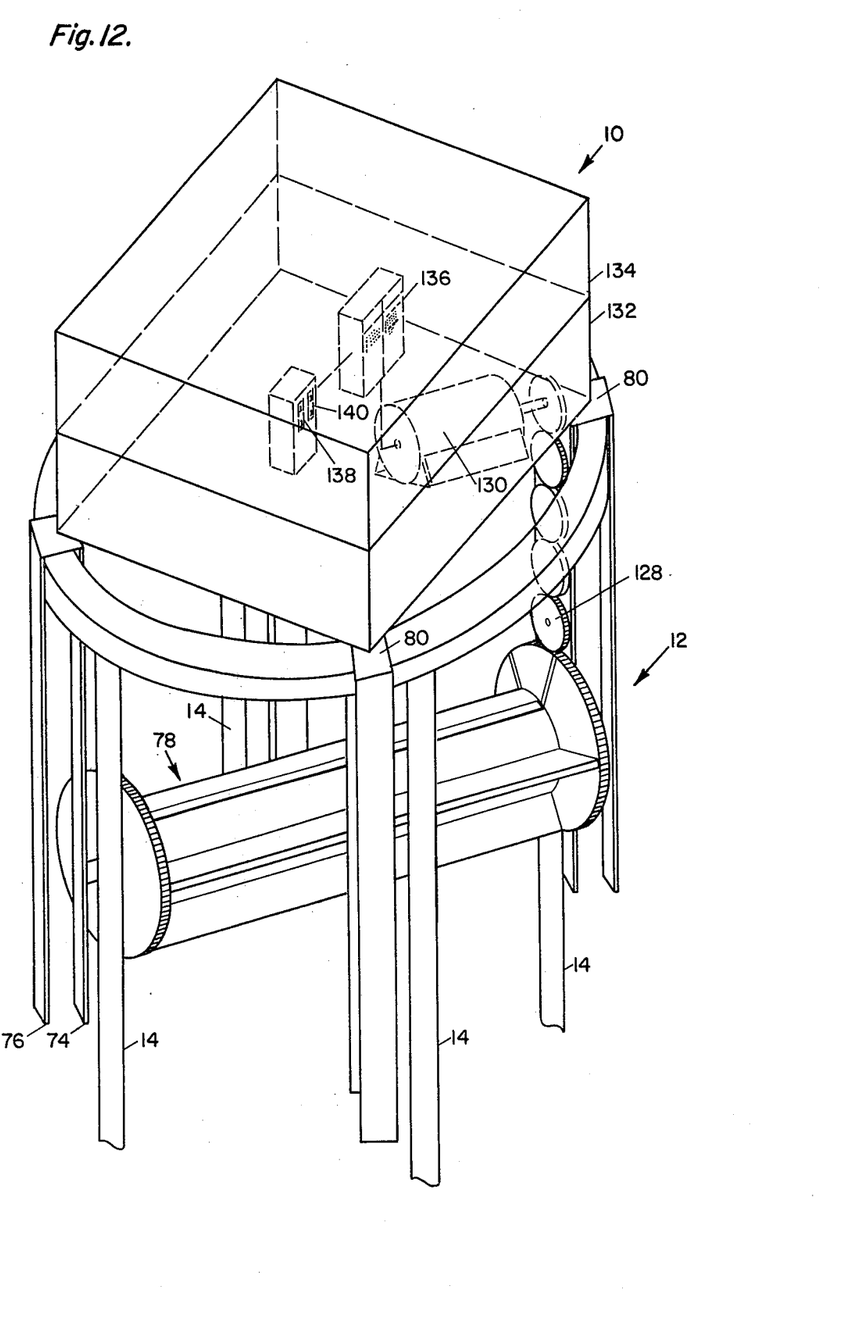
FIG. 12 is a perspective view of the preferred embodiment of the invention in which the rotor includes a plurality of sliding plates.

The basic invention 10 may best be appreciated by referring to FIG. 12. A support structure 12 includes four columns 14 each having one end 16 anchored in the bed 18 of the river or ocean. The foot 16 of the column may rest upon a slab 20 between it and the seabed 18. The upper end 22 rises above the surface of the water 24. Each column 14 carries with it at least two bolts 26 embedded in the top end 22. The bolts 26 may be threaded so as to receive a hold down nut 28.

Figure 1:
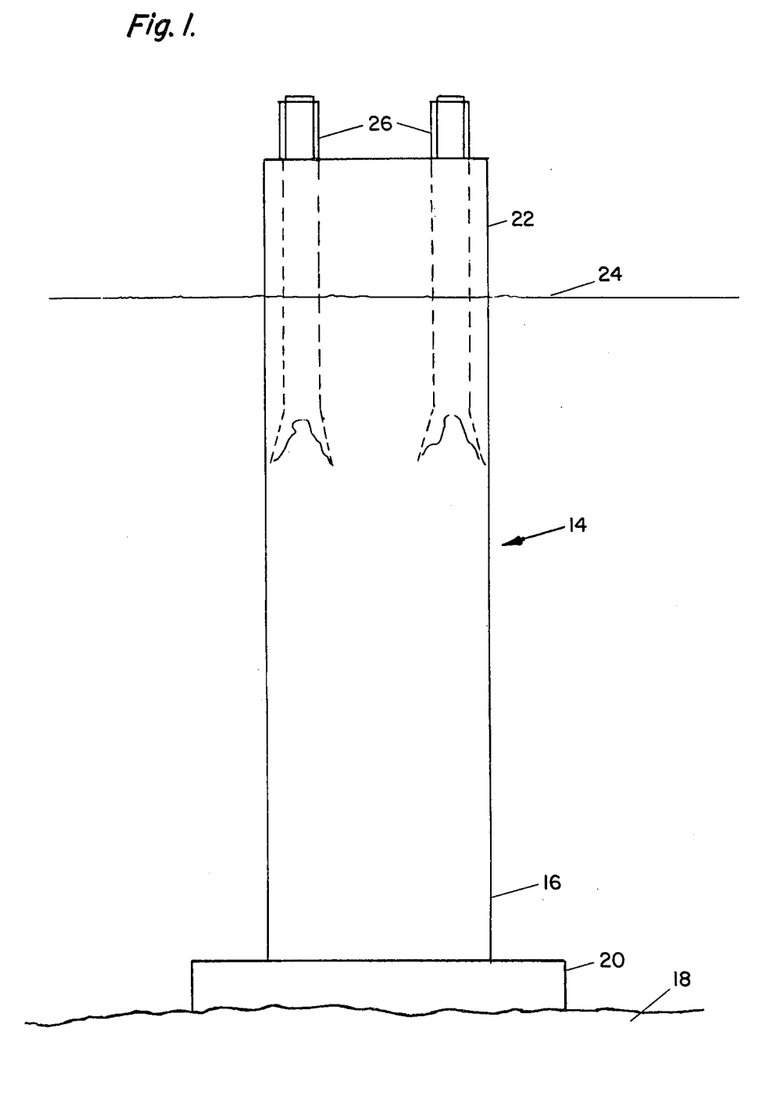
FIG. 1 is an elevational view of one of the support columns.
Figure 2:
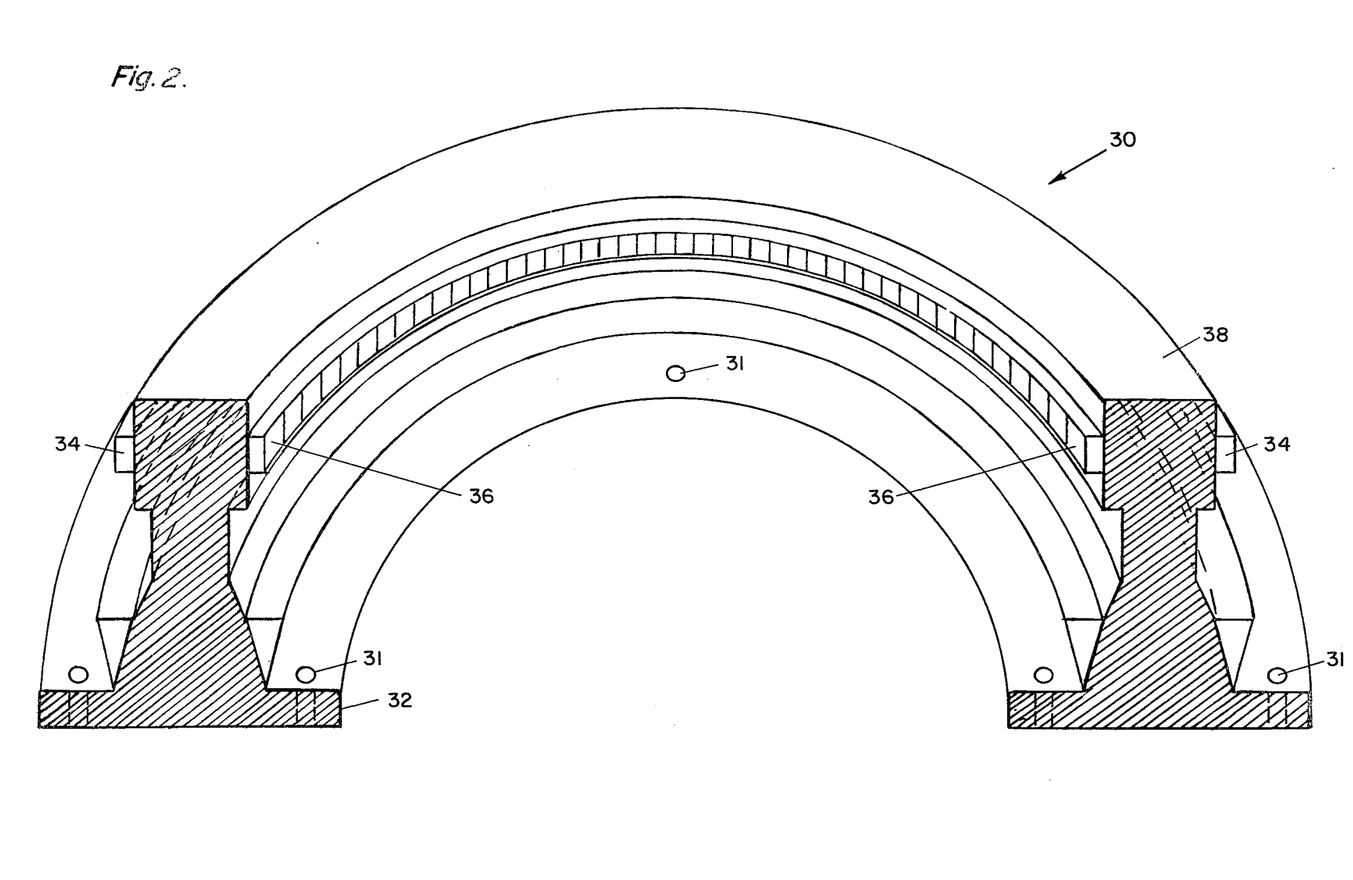
FIG. 2 is a perspective cross-sectional view of the circular monorail.
Figure 9:
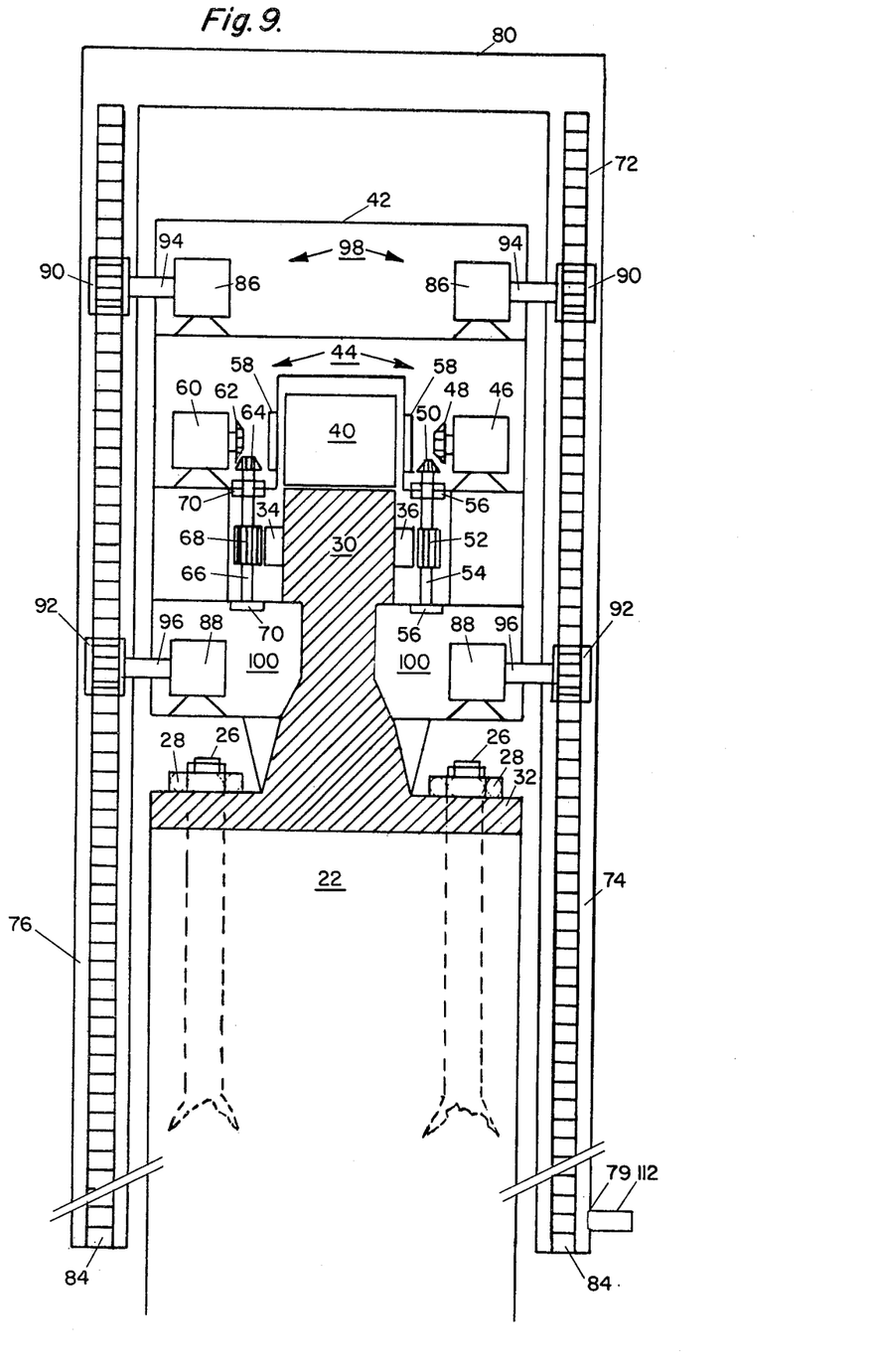
FIG. 9 is a cross-sectional elevational view of the invention of FIG. 8 as seen from lines 9—9.
Figure 10:
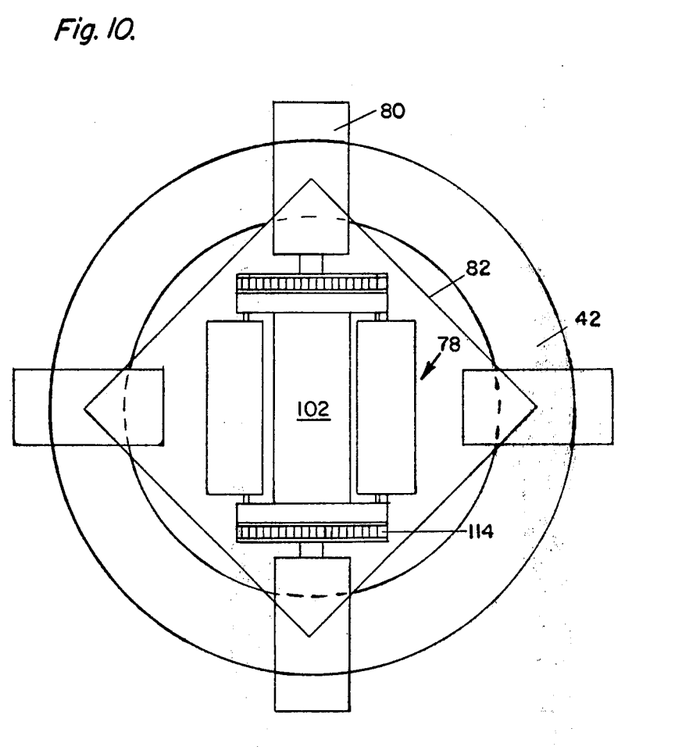
FIG. 10 is a partial cross-sectional top plan view of the preferred embodiment of the invention.

A circular monorail 30, such as shown in FIG. 2, is attached to the top of column 14 by the bolt 26 and nut 28 combination in the manner illustrated in detail in FIG. 9. The foot 32 of the monorail 30 includes receiving apertures or slots 31 through which the bolt 26 may pass. The nut 28 is then screwed down on top of the bolt 26 thereby forcing the foot 28 against the upper end 22 of the column 14. Monorail 30 includes an exterior side gear rack 34 and an interior side gear rack 36. The top of the monorail 30 includes a relatively flat surface 38 which acts as a bed for roller bearing 40 as shown in FIG. 9.

Figure 3:
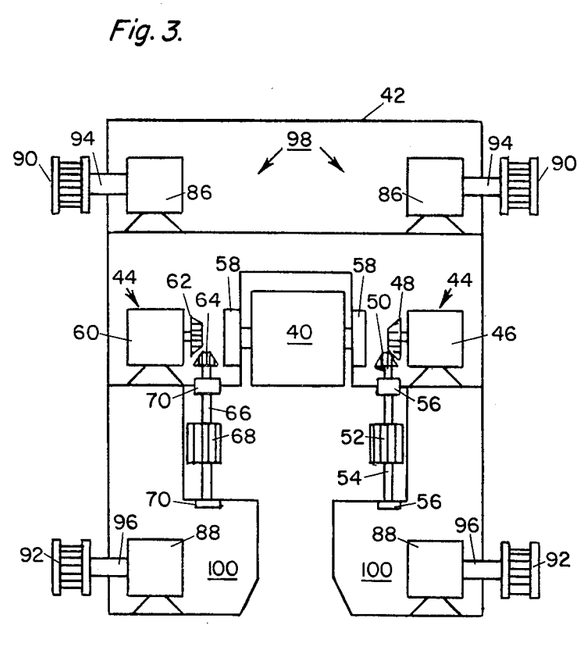
FIG. 3 is a cross-sectional elevational view of the circular housing which rides on the monorail showing the horizontal and vertical drive motor and gear combinations.

A circular housing 42 such as illustrated in FIG. 3 and in more detail in FIG. 9, is received on top of the monorail 30. The circular housing 42 includes a set of horizontal drive motors and gear combinations 44. An interior set of four drive motors 46 drives four 45° bevel gears 48. Bevel gear 48 engages another 45° bevel gear 50 which transmits rotary power to pinion drive gear 52. Pinion drive gear 52 is supported on a transverse shaft 54 which is held in place by a pair of conventional bearings 56. Pinion gear engages interior rack 36 so that the rotation of motor 46 causes the housing 42 to rotate in a horizontal plane. Housing 42 is supported by roller bearing 40 which impinges against the flat top surface 38 of monorail 30. Roller bearing 40 is supported at both ends thereof by a pair of conventional bearings 58.

A set of exterior drive motors 60 are used to complement the interior drive motors 46 in propelling the housing 42 in a circular motion. Exterior horizontal drive motor 60 is connected through a pair of 45° bevel gears 62 and 64 and a shaft 66 to a drive pinion gear 68 which impinges on exterior rack 36. Shaft 66 is supported at both ends thereof by a pair of conventional bearings 70. Accordingly, a total of eight horizontal drive motors 46 and 60 are employed to drive the housing 42 in a circular manner.

Four vertical rack structures 72 are received over the circular housing 42 in an inverted U-shaped manner. An interior leg 74 and an exterior leg 76 extends downwardly under the normal water line 24. The rotor 78 is rotatably connected across two of the interior legs 74 in the manner shown in FIGS. 8 and 12. Legs 74 and 76 are connected together by a flat horizontal common member 80 which acts as a bearing surface for the control house 82. Bearing hole 7A receives rotor axle 112 in a manner to be described later.

Figure 8:
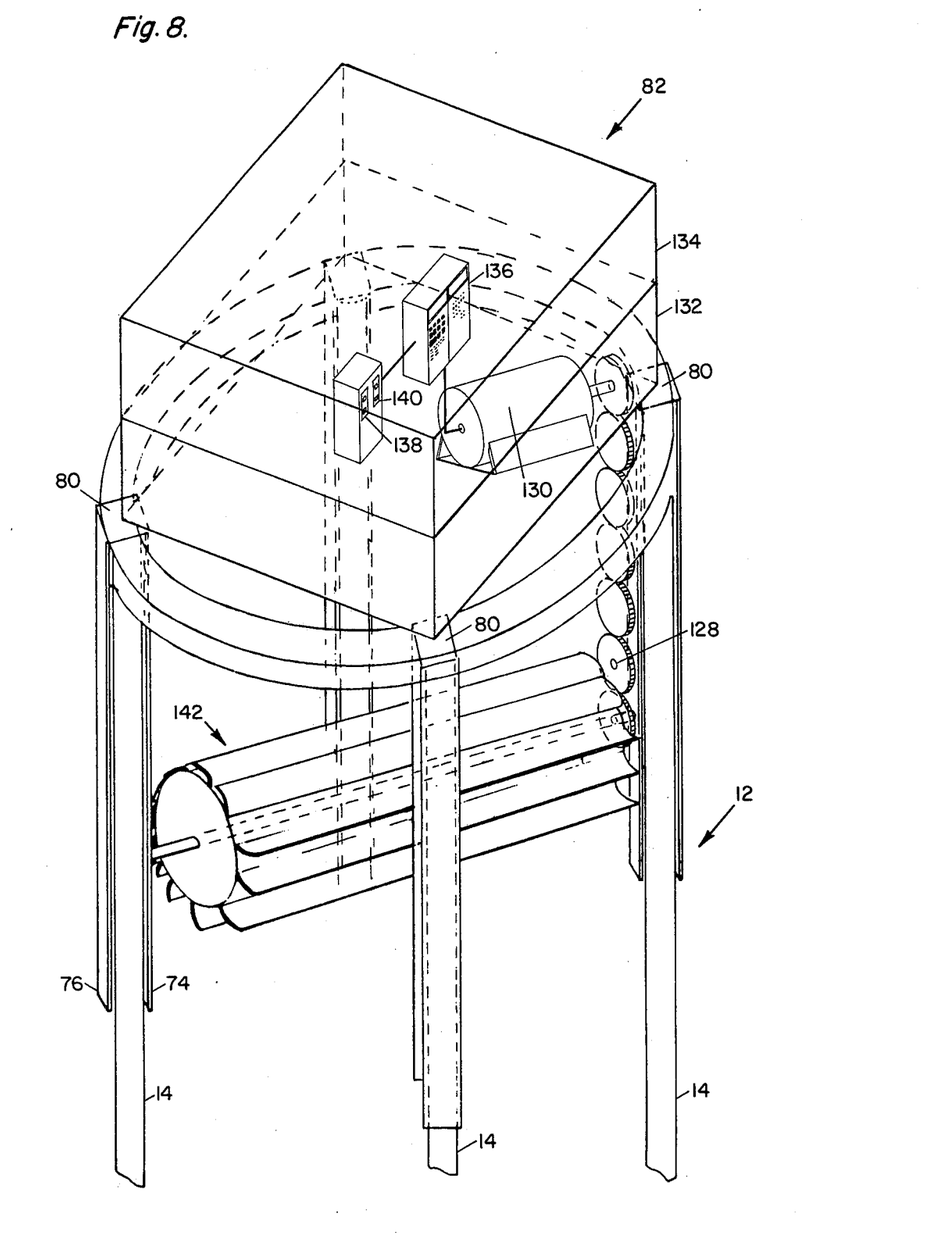
FIG. 8 is a perspective view of one embodiment of the invention.

The edges of each of the legs 74 and 76 include a vertical gear rack 84. Accordingly, each of the vertical rack structures 72 include four vertical gear racks 84 thereon. Therefore, because there are four vertical rack structures, there are a total of sixteen vertical gear racks associated with the preferred embodiment of the invention. Each vertical gear rack in turn is associated with two motors 86 and 88 and two pinion drive gears 90 and 92 respectively. Pinion gear 90 is connected to motor 86 by a conventional drive shaft 94. Likewise pinion drive gear 92 is connected to motor 88 by a conventional drive shaft 96. Accordingly, there is an upper bank 98 of 16 vertical drive motors 86 and associated pinion gears 90. There is also a lower bank 100 of sixteen drive motors 88 and associated pinion gears 92. Altogether there are thirty-two vertical drive motor and pinion gear combinations for lowering and raising vertical rack structure 72. Similarly, there are eight horizontal drive motors 46 and 60 for driving circular housing 42 and its associated vertical rack structures 72 in a horizontal plane. FIG. 8 shows the vertical rack structure 72 lined up over the associated four columns 14. That is purely coincidental and it will be appreciated from the invention that the vertical rack structures do not necessarily coincide over columns 14 at any particular time.

Details of the structure of the rotors 78 may be best understood by referring to FIGS. 4A, 4B, 5A, 5B, 6A and 6B. According to the preferred embodiment of the invention, the rotor as shown in FIGS. 4A, 4B, 5A and 5B includes a housing 102 and a plurality of sliding rotor blades 104. Housing 102 is formed by eight wedge-shaped sections 106 which are mounted together in such a way as to form four either secting slots of passageways 108. A pair of flanges 110 are located at opposite ends of the eight wedges 106 and serve to hold the wedges in position. A pair of axles 112 extend outwardly from each flange 110 and are receivable in a conventional bearing 79 in interior legs 74 in a manner previously described. A circular gear rack 114 circumscribes the periphery of flanges 110. The exterior of the wedges 106 may be covered by an appropriate metal skin 116. The housing 102 thus formed includes four slots 108 and eight external ports 118 associated with the two opposite ends of each slot 108. Each slot 108 is sufficiently wide so that the blade 104 may slide across the center of the rotor housing 102 under the influence of gravity. However, the ports 118 are shorter in their long dimension than is the width of any individual blade 104. Accordingly, blades 104 cannot slide out of the housing 102. Each blade 104 is equipped with a tab 120 which will engage the inside edge of a port 118 and prevent it from falling out.

Figure 4A:
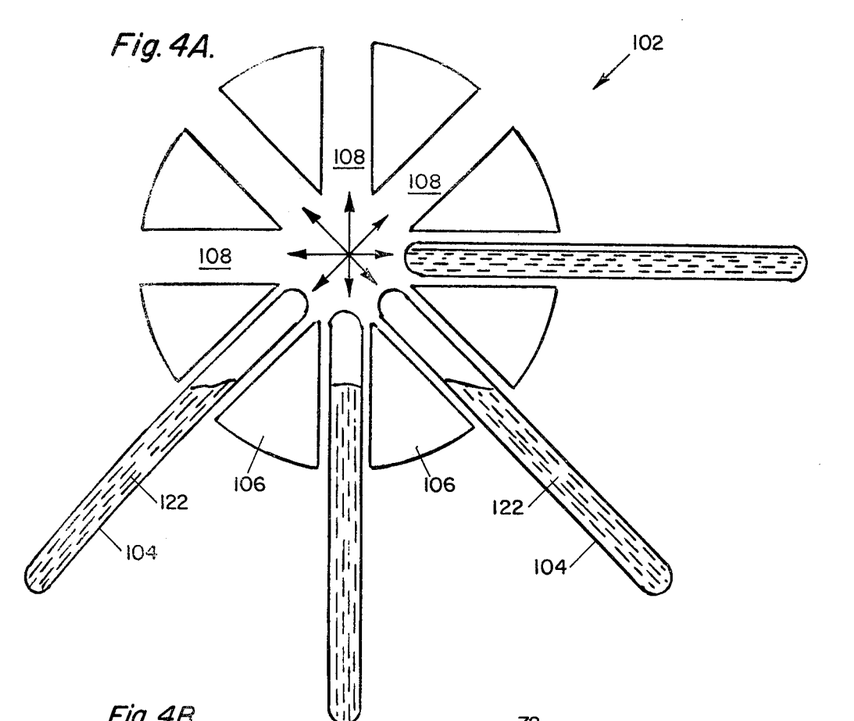
FIG. 4A is a schematic cross-sectional view of the rotor according to the preferred embodiment of the invention.
Figure 4B:
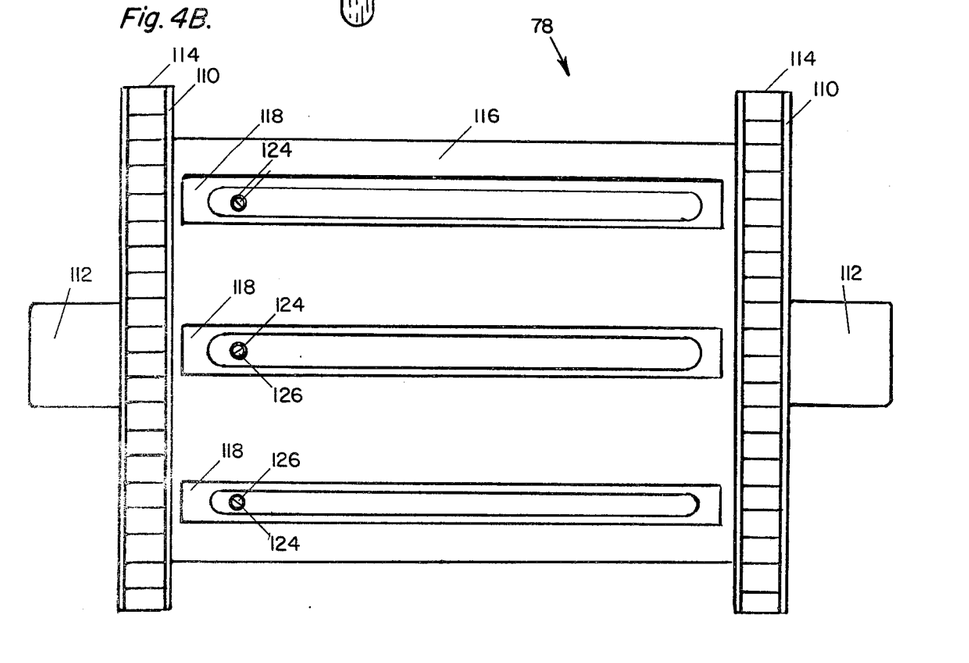
FIG. 4B is an elevational view of the rotor of FIG. 4A as seen from the front.
Figure 5A:
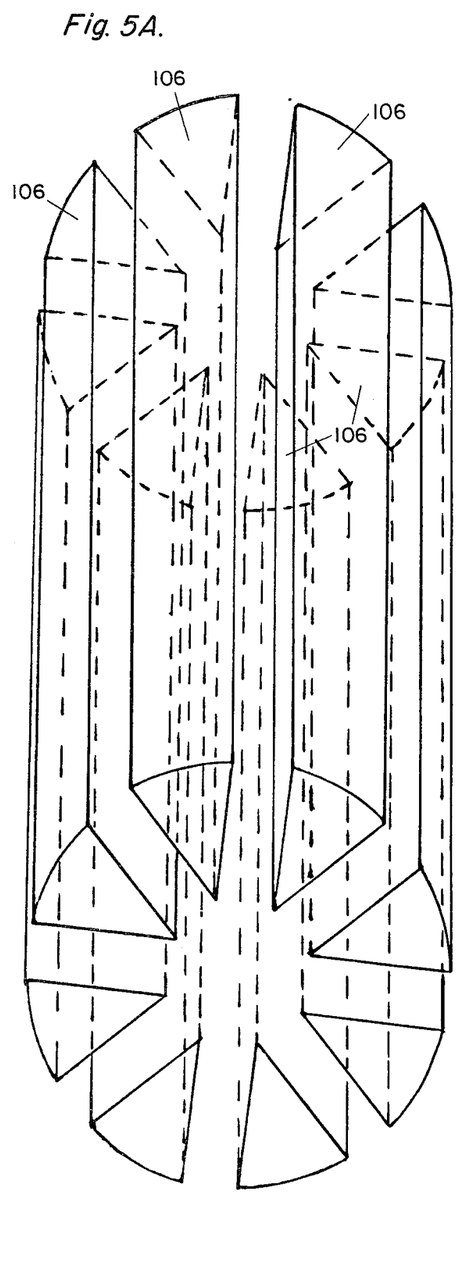
FIG. 5A is a perspective partial cross-sectional view illustrating the manner in which eight elongated pie-shaped sections form the rotor housing.
Figure 5B:
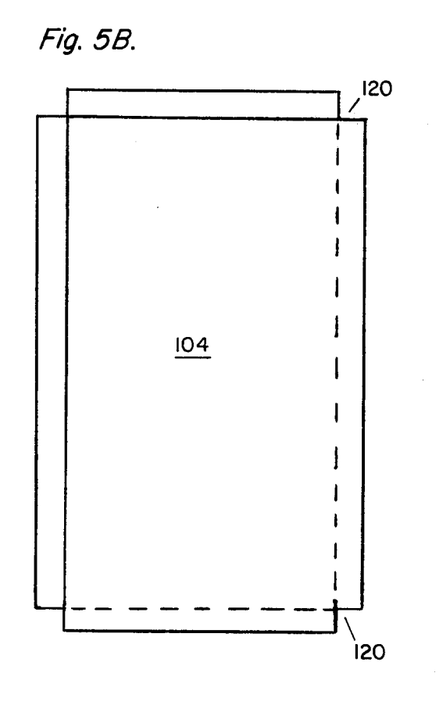
FIG. 5B is a perspective elevational view of a typical rotor blade.

The structure of the preferred blade 104 may be best understood by referring to FIGS. 4A and 5B. The blades are preferably made from an anti-corrosive material such as stainless steel with a plastic or chrome coating. The rotor housing 102 is preferably formed from aluminum in order to conserve weight and prevent rust. The blades 104 are filled with a suitable heavy liquid 122 such as mercury. Mercury is preferred because it is heavy and will quickly respond to changes in inclination. Accordingly, the use of mercury, or a similar material will cause the blades to reciprocate faster than might occur with the use of lighter non-mobile materials. The mercury may be introduced into the blades 104 through ports 124 located at the edge of each of the blades 104. A screw cap or similar plug 126 may be used to cover the input port 124.

Figure 11A:
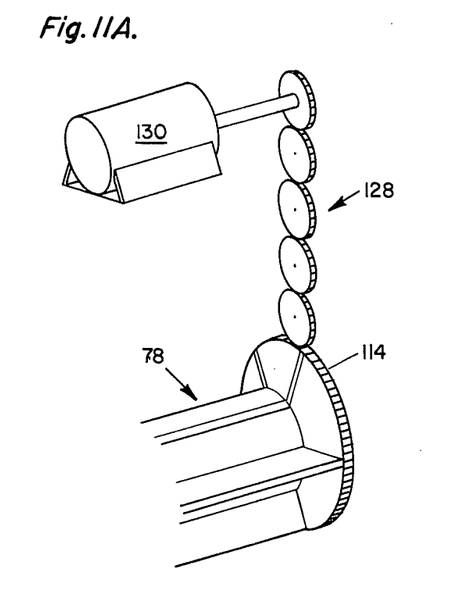
FIG. 11A is a perspective view of a gear train connecting the rotor to the generating means according to the preferred embodiment of the invention.

The flange gear rack 114 engages the lower gear of the gear train 128 illustrated in FIG. 11A. Gear train 128 transmits the rotary energy from rotor 78 up to the generators 130 inside the control house 82.

The control house 82 preferably has four edges which respectively sit on the top portion 80 of the vertical rack structure 72. Therefore the control house 82 moves up and down and horizontally with movement of the rotor 78. The control house 82 illustrated in FIGS. 8 and 12 includes a lower floor 132 and an upper floor 134. The lower floor 132 would preferably contain the generating equipment 130. Generating equipment 130 is of a conventional nature and may be either of the AC or DC variety, depending upon need. Energy developed by generator 130 might either be stored in a conventional manner, or as would be more likely, transmitted via underwater cables to a substation on land. Either generators or alternators could be used. It is preferable that the generators employed be of the self-governing variety so that changes in the speed of rotor 78 do not appreciably change the speed of the generators 130 or their electrical output.

The upper floor 134 would preferably include the control area and a conventional automatic control system, such as a computer 136. The computer 136 would preferably have a memory which stored sufficient data so that during any 24 hour period of any of the 365 days of the year the rotor 78 would be placed in the path of the strongest underwater current so as to most efficiently produce electricity. Such a system might be referred to as a passive system in that it depends upon a memory of previous events. Alternatively, the computer 136 could be connected to conventional velocity and tide measuring instruments which would give it an active input indicating the location and velocity of the current flowing through columns 14. The use of such automatic equipment would be relatively easy in the context of this invention. As a final alternative, it would be possible to manually control the horizontal and vertical motion of rotor 78 by means of a horizontal and vertical switch mechanism attached to the eight horizontal drive motors 46 and 60 and the thirty-two vertical drive motors 86 and 88. A vertical switch 138 and a horizontal switch 140 are illustrated in the context of the upper story 134 of the control house 82.

The device according to the preferred embodiment of the invention operates in the following manner. The rotor 78 is preferably located in the vertical direction so that it is in the path of the strongest underwater current. This is accomplished through the use of vertical drive motors 86 and 88. At the same time the rotor 78 is horizontally driven by motors 46 and 60 so as to place the rotor 78 directly perpendicular to the flow of the strongest underwater current.

As water impinges upon mercury filled blades 104 the entire rotor mechanism 78 begins to revolve. Each time an individual blade is lifted above the center of rotor housing 102 it will slip downwardly across a slot 108 and pop up on the downward end of the slot. Therefore a blade 104 slides across the rotor housing 102 twice for each revolution of the rotor 78. The blades 104 do not interfere with each other because one blade tends to complete its trip before the other one begins. It is clear from the configuration of the mechanism that the blades 104 all tend to remain in the lower 180° portion of the rotor housing 102. That is to say they always tend to slide out of the top 180° and into the bottom 180° when the rotor is looked at from the end as seen, for example, in FIG. 4A. The rotor 78 rotates, of course, because the resistance on the top 180° is lower than the resistance on the bottom 180°. Or, expressed another way, the effective paddle-length in the bottom 180° is greater than the effective paddle-length on the top 180°.

The rotation of rotor 78 is transmitted through flange rack 114 and gear train 128 up to generator 130. The generators are equipped with conventional speed controls in order to optimize their output and reduce fluctuations in line current and voltage.

Computer 136 is programmed either with a memory or a set of sensors or both in such a fashion as to place the rotor 78 in the optimal stream of underwater current. While it is preferred to place the rotor 78 in the strongest current, there may be circumstances where it is desirable to place it in some other location. If so, this can be accomplished either through pre-programming in computer 136 or by the use of the manual control switches 138 or 140.

The device according to the preferred embodiment of the invention is believed capable of generating power in the neighborhood of 6 megawatts. The rotor 78 has an effective blade area of 15,000 square meters (15 meters wide by 100 meters long). Calculations indicate that it is possible to generate as much as 250 kilowatts per square meter with such a device and more. That is to say, the device described can generate 3.75 megawatts, or under perfect conditions up to 6 megawatts.

The energy generated by the preferred embodiment can be mathematically expressed by the following formula $$P_{max} = pA V_a^3/4$$

where:
Pmax = maximum electrical power output
p = constant factor
A = effective blade area
$V_a$ = current velocity It is clear from the above that the output is proportional to the cube of the current velocity. Accordingly, it is extremely important to place the rotor directly in and perpendicular to the strongest underwater current. For example, a current of 4 knots will generate 8 times the power of an underwater current of 2 knots if all other conditions are equal.

Figure 6A:
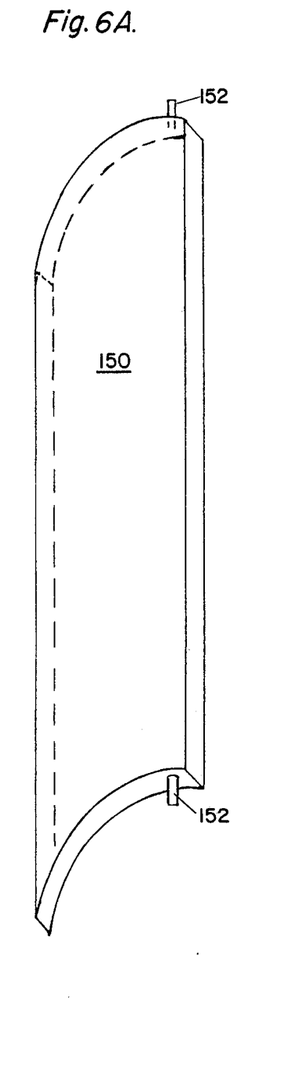
FIG. 6A is an elevational view of a rotor blade according to an alternative embodiment of the invention.
Figure 6B:
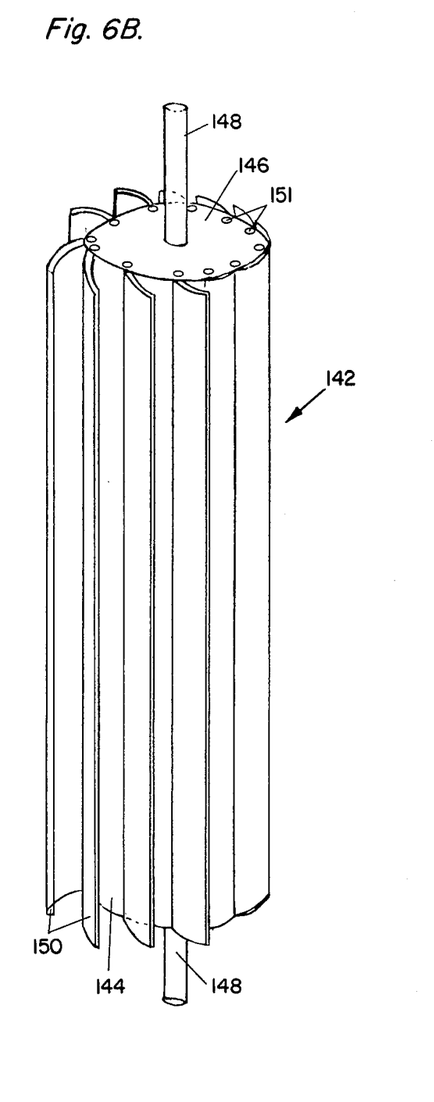
FIG. 6B illustrates the manner in which and alternative rotor blade of FIG. 6A is attached to the periphery of the rotor housing.
Figure 7:
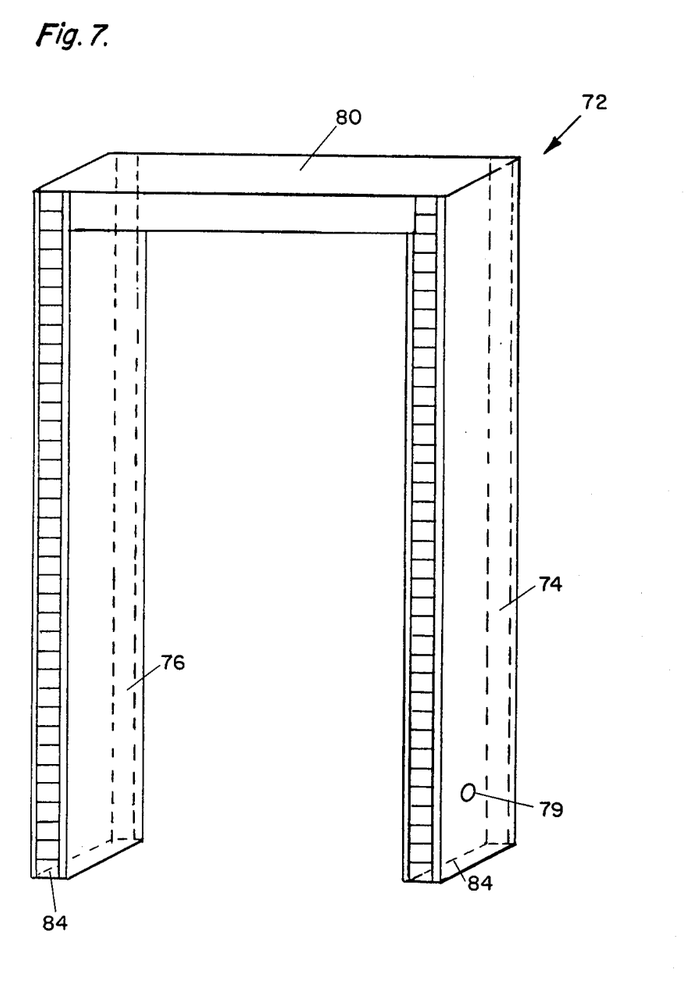
FIG. 7 is a perspective elevational view of the vertical rack structure which sits on the circular housing of FIG. 3.

FIGS. 6A and 6B illustrate an alternative embodiment of the rotor mechanism 78. That embodiment 142 includes a relatively solid housing 144 and a pair of end flanges 146 mounted on axles 148. A plurality of pivotal curved vanes or blades 150 are rotatably attached to the flanges 146. A pair of studs 152 are connected at the rear edge of blades 150 and adapted to be rotatably received in corresponding holes 151 in flange 146.

The ultimate embodiment of the rotor 142 operates in the following manner. Water current impinging upon the rotor 142 causes the vanes 150 to open up and increases the resistance of that side of the rotor. As the rotor 142 turns approximately 180° the vane 150 will find itself reversed with respect to the direction of the current and will assume a position closer to the body of the rotor housing 144. Therefore, because the resistance to the current is greater on the side of the rotor 142 having the open vanes, the rotor 142 will continue to rotate as long as the current flows against it.

Figure 11B:
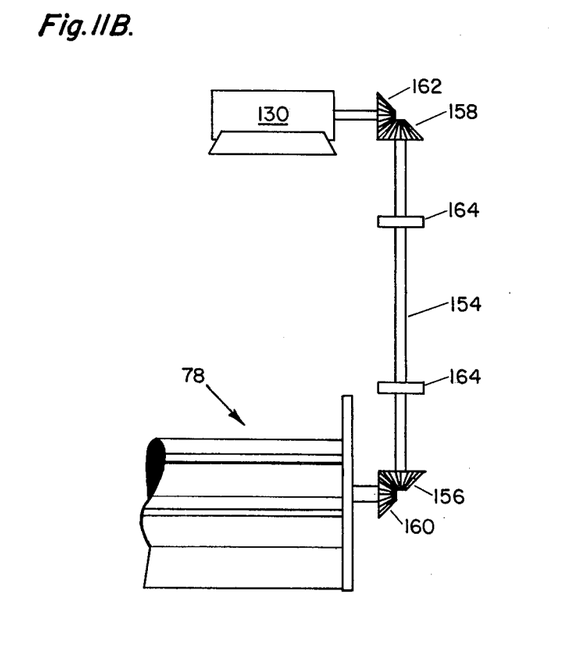
FIG. 11B is a perspective view of an alternative embodiment in which the rotor is connected to the generator by means of two right angled gear drives and a vertical rotating transmission shaft.

As shown in drawing 11B, the power from the rotor 78 may be transmitted to the generators 130 via a long vertical shaft 154. Both ends of the shaft 154 are capped by 45° bevel gears 156 and 158 respectively. A 45° bevel gear 160 is attached to the rotor 78 and engages the bottom 45° bevel gear 156. Similarly, the generator 130 is connected via a 45° bevel gear 162 which engages the other 45° bevel gear 158. Therefore, rotation of the rotor 78 is transmitted through 45° bevel gears 156 and 160, vertical shaft 154, and top bevel gears 158 and 162 to the generator mechanism 130. The preferred length of the vertical shaft 154 is in the neighborhood of 30 meters from top to bottom.

The following additional advantages and features are of importance.

The invention 10 is basically self contained in that it does not require the input of outside energy to make it work. The upper floor 134 of the control house 82 may be used as a helicopter landing pad if necessary. The sliding blades 104 of the preferred embodiment of the rotor 78 have the advantage that they are self cleaning. The sliding reciprocal motion of the blades 104 across the slots 108 tends to cause corrosion and sea life build up to be continually scraped or worn off. It will also be appreciated that the apparatus is absolutely non-polluting in that it does not produce smoke or refuse as a by-product of the production of electrical power. The gear train 128 of FIG. 11A should preferably be enclosed within a casing 129 which prevents water from ruining the gears which may be made of materials such as brass. The blades 104 are preferably made from anti-corrosive stainless steel with a plastic or chrome coating. The rotor 78 may be made of aluminum. The columns 14 could be made of prestressed concrete or steel I beams. There are a variety of other known materials which might be suitable for use with this invention. Such materials are known, for example, in the off-shore oil well drilling art.

FIGS. 11A and 11B illustrate two of several possible methods of transmitting power from the rotor 78 to the generator 130. In addition to what has been described, it is possible to pump hydraulic fluid or some other medium through a hose or the like and drive an hydraulic motor. The number of gears in gear train 128 depends in large part upon the depth to which one wishes to place the rotor 78. As shown in FIG. 11A, the preferred number of gears is approximately five. However, one may choose more or fewer gears depending upon the likely depth of the optimum underwater current. A gear train housing 129 protects the gears from corrosion.

The rotor 78 preferably has an effective width of 15 meters and a length of 100 meters. The size of the rotor, however, would vary according to the amount of electricity desired and the velocity of the underwater current, among other factors.

The positioning of the rotor 78 can be fine-tuned to the characteristics of the underwater current. Normally a great deal of horizontal and vertical adjustment is not required. However, in areas where the currents reverse, such as in tidal basins, or where currents otherwise change directions, the use of a horizontal and vertical adjustment could be critical especially in view of the fact that the power generated is proportional to the cube of the velocity of the underwater current.

The apparatus is preferably placed on four columns 14. Clearly greater or fewer than four columns could be used. As a minimum three columns could be employed, and there is no maximum except that too many columns might interfere with the flow of the current. The columns 14 should be placed where the current is least strong so as to produce the fewest eddys and the minimal amount of drag. If the current flow is strong, it may be desirable to streamline the profile of the columns 14. For example, a Rhombic, diamond-like cross-section might be desirable where the long axis of the cross-section faces directly into the current.

While the foregoing has been described with reference to the preferred embodiment thereof it will be appreciated by those of ordinary skill in the art that various changes may be made to the structure and function of the individual elements that make up the invention without departing from the spirit and scope thereof.

I claim:

1. An apparatus for generating electrical energy from underwater currents comprising:
   a structure for supporting said apparatus in water;
   rotor means rotatably attached to said structure and locatable in said underwater currents, said rotor means comprising a housing and a plurality of movable blades, said housing including a plurality of interior slots which pass through the center of said housing and which respectively slidably receive said movable blades;
   generating means connected to said rotor means for generating electrical energy; and,
   drive means for positioning said rotor means relative to said structure.

2. An apparatus for generating electrical energy from underwater currents comprising:
   a structure for supporting said apparatus in water;
   rotor means rotatably attached to said structure and locatable in said underwater currents, said rotor means comprising a housing and a plurality of movable blades, said movable blades comprising a plurality of flaps pivotably connected at one end to the housing of said rotor means;
   generating means connected to said rotor means for generating electrical energy; and,
   drive means for positioning said rotor means relative to said structure.

3. An apparatus for generating electrical energy from underwater currents comprising:
   a structure for supporting said apparatus in water;
   rotor means rotatably attached to said structure and locatable in said underwater currents, said rotor means comprising a housing and a plurality of movable blades, said housing including a plurality of interior slots which pass through the center of said housing and which respectively slidably receive said movable blades; and,
   generating means connected to said rotor means for generating electrical energy.

4. The apparatus of claim 1 wherein said blades include a tab means thereon to keep them slidably engaged in said slots.

5. The apparatus of claim 4 wherein said structure further includes:
   a plurality of column means supported at a lower end by the bed under the underwater currents;
   a circular monorail means attached to the upper end of said plurality of column means;
   a circular housing means for riding over said monorail means;
   vertical rack means movably attached to said circular housing means, said rotor means being attached to said vertical rack means; and,
   an upper compartment means attached to said vertical rack means for supporting said generating means.

6. The apparatus of claim 5 wherein said monorail means includes at least one circular gear rack means thereon; and, said circular housing means includes a first drive motor and gear means therein for engaging said circular rack means on said monorail means for driving said rotor means in a plane horizontal to the general plane of said monorail means.

7. The apparatus of claim 6 wherein said vertical rack means includes at least two vertical gear racks; and, said circular housing means includes a second drive motor and gear means for engaging said at least two vertical gear racks and for driving said rotor means in a plane perpendicular to the general plane of said monorail means.

8. The apparatus of claim 7 further including:

gear train means for transmitting power from said rotor means to said generating means.

9. The apparatus of claim 8 wherein said movable rotor blades are filled with liquid.

10. The apparatus of claim 9 wherein said movable rotor blades are filled with mercury.

11. The apparatus of claim 10 further including:

automatic control means for controlling the motion of said first drive motor and gear means and said second drive motor and gear means.

12. The apparatus of claim 11 wherein said structure includes at least four column means; and, said monorail means includes at least an interior and exterior gear rack means; and, said first drive motor and gear means includes at least four interior motor and gear combinations for engaging said interior gear rack means and four exterior motor and gear combinations for engaging and driving said exterior gear rack means; and, said vertical rack means includes at least four vertical gear racks thereon; and, said second drive motor and gear means comprises at least thirty-two motor and gear combinations for driving said vertical housing means vertically;

said rotor means includes a housing having at least four slots therein; and, said plurality of movable blades comprises at least four movable blades.

13. The apparatus of claim 7 further including:

a first right angle gear drive means connected to at least one end of said rotor means;

a vertical rotatable transmission shaft connected at one end to said first right angle gear drive means; and, a second right angle gear drive means connected to the other end of said vertical rotatable shaft and to said generating means.

* * * * *